United States Patent [19]

Hunt

[11] Patent Number: 5,180,141

[45] Date of Patent: Jan. 19, 1993

[54] TOOL FOR HANDLING WHEEL ASSEMBLIES AND METHOD FOR MANIPULATION THEREOF

[76] Inventor: Thomas R. Hunt, 755 Park, Lincoln Park, Mich. 48146

[21] Appl. No.: 826,269

[22] Filed: Jan. 24, 1992

Related U.S. Application Data

[63] Continuation of Ser. No. 585,806, Sep. 20, 1990, abandoned.

[51] Int. Cl.$^5$ .................................................. B66F 3/00
[52] U.S. Cl. ........................................ 254/131; 29/273
[58] Field of Search ............... 254/120, 131, 133 R; 29/267, 270, 273

[56] References Cited

U.S. PATENT DOCUMENTS

| | | | |
|---|---|---|---|
| 1,890,273 | 12/1932 | Wells | 254/131 |
| 2,048,233 | 7/1936 | Thomas | 254/131 |
| 2,212,716 | 8/1940 | Noble et al. | 254/131 |
| 2,504,345 | 4/1950 | Nellis | 254/131 |
| 2,619,320 | 11/1952 | Miller | 254/131 |
| 2,639,121 | 5/1953 | Hudspeth | 254/131 |
| 2,680,003 | 6/1954 | Feinstein | 254/131 |
| 2,701,707 | 2/1955 | Miller | 254/131 |
| 2,808,162 | 10/1957 | Hellyer | 214/332 |
| 2,857,136 | 10/1958 | Thomas | |
| 2,904,309 | 9/1959 | Mayville | 254/131 |
| 2,907,106 | 10/1959 | Lockwood | 30/169 |
| 3,649,976 | 3/1972 | Isom | 29/273 |

FOREIGN PATENT DOCUMENTS 501643 3/1951 Belgium .............................. 254/131

Primary Examiner—J. J. Swann
Attorney, Agent, or Firm—Brooks & Kushman

[57] ABSTRACT

A tool for removing from a vehicle axle a wheel-tire assembly or replacing the assembly thereupon and for maneuvering the assembly from a horizontal position to a vertical position, all with minimal effort. The tool includes a wheel support section for supporting the wheel-tire assembly during removal and replacement of the assembly, a leverage section for transmitting forces exerted by an operator, and a handle section for manipulation by the operator. The handle section has a hooked portion which is inserted between the wheel-tire assembly and a work area for the purpose of manipulating the assembly. The invention includes a method for manipulating the tool so that the wheel-tire assembly may readily be maneuvered into desired operating positions with the exertion of minimal effort.

5 Claims, 1 Drawing Sheet

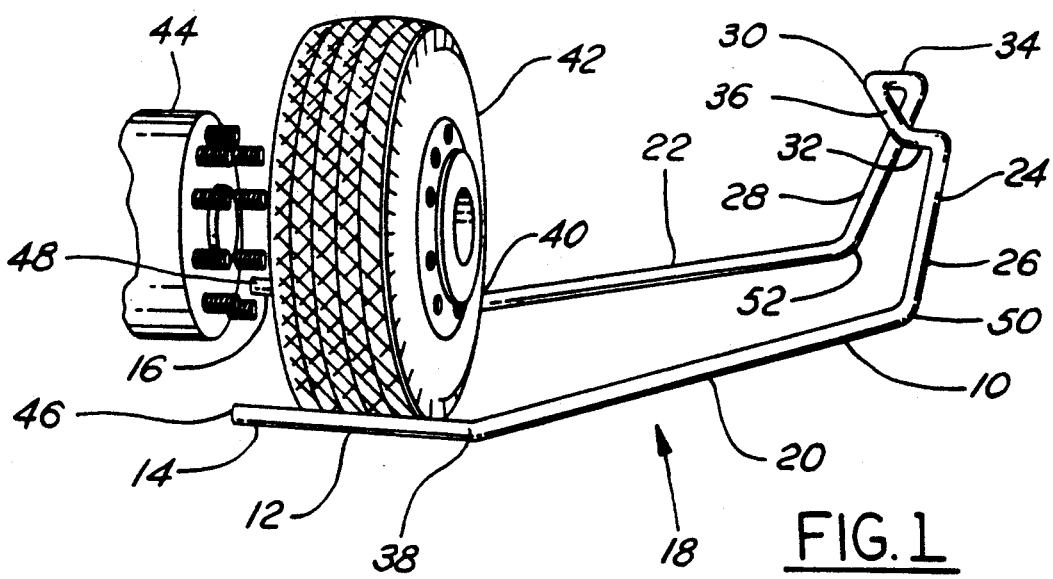
FIG. 1
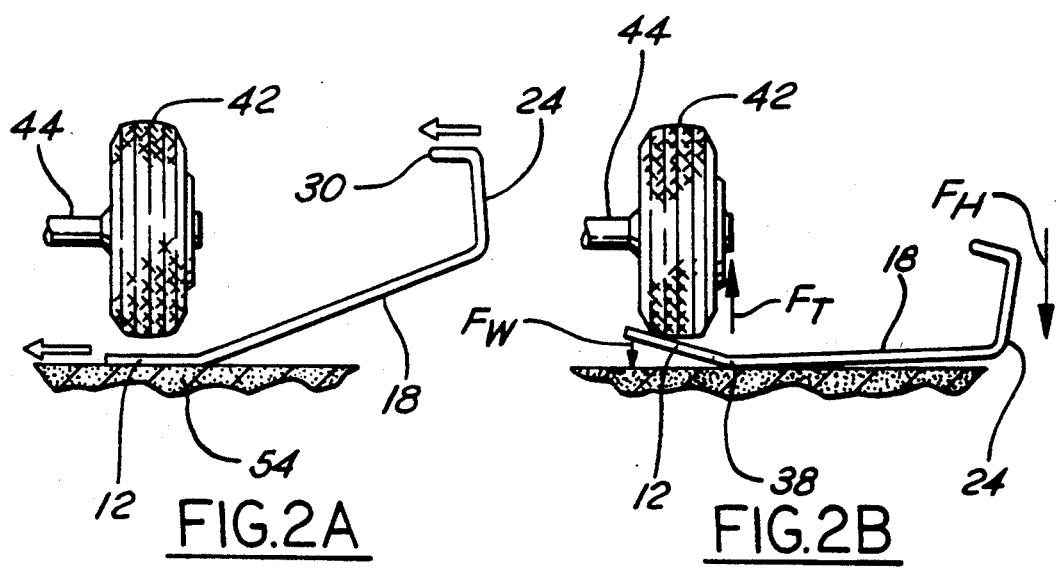
FIG. 2A
FIG. 2B
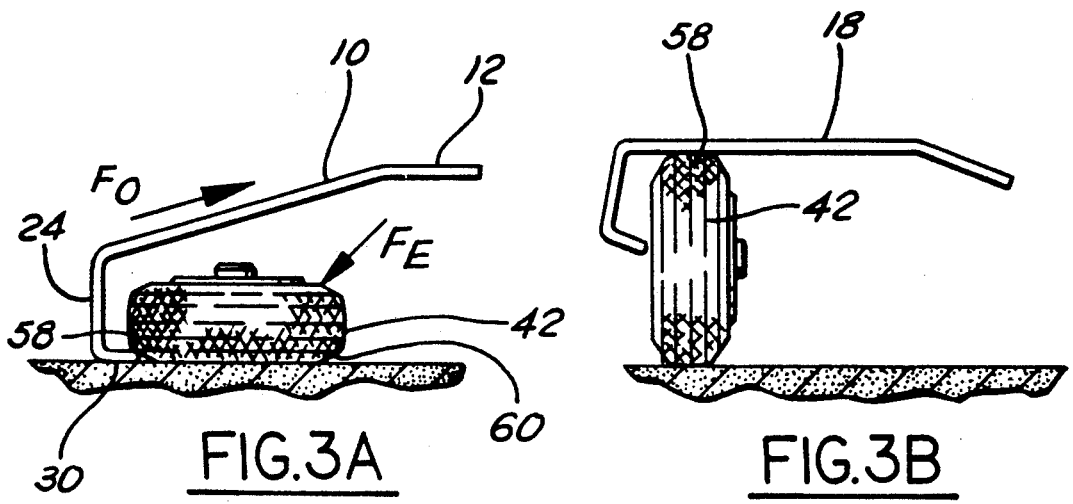
FIG. 3A
FIG. 3B

TOOL FOR HANDLING WHEEL ASSEMBLIES AND METHOD FOR MANIPULATION THEREOF

This is a continuation of copending application Ser. No. 585,806 filed on Sep. 20, 1990, now abandoned.

TECHNICAL FIELD

This invention relates to a tool for removing a wheel-tire assembly from a vehicle axle and maneuvering and replacing the wheel-tire assembly thereupon, thus relieving an operator performing these tasks from unnecessary exertion and avoiding the need to directly lift the wheel.

BACKGROUND ART

Wheel lifting tools and wheel jacks are used to assist operators in lifting and removing wheels or wheel-tire assemblies from vehicle axles. Conventional wheel lifting tools are inefficient because they require a significant force to be exerted by the operator to manipulate truck tires or other heavy tires and leave unsolved the problems of manipulating a heavy wheel-tire assembly after separation from the vehicle axle. See, for example, U.S. Pat. Nos. 2,619,320; 2,639,121; 2,701,707; 2,808,162; 2,857,136; and 2,904,309.

Partial solutions to the problems of removal, manipulation and replacement of heavy wheel-tire assemblies have called for the use of lifts which introduce the use of a foot pedal to lift the tire to the appropriate height so it can be replaced. Other solutions require the use of an operator's hands to lift the wheel, which puts a potentially injurious strain on the operator's back.

One remaining problem, however, is that these are not effective methods for removing or lifting wheel-tire assemblies which are extremely heavy, such as those used on heavy transport vehicles including trucks.

Another difficulty unsolved by prior approaches is that of maneuvering a heavy wheel for replacement onto an axle. The wheel usually lies flat on the ground or on a work area after being repaired and must be lifted to a vertical position. This also strains the operator's back when performed manually. In removing or replacing a wheel from a truck axle manually, the operator also runs the risk of entrapping his hands between the wheel and the axle.

Related problems also exist with removing and installing wheel-tire assemblies in conventional automobiles. But such problems are especially acute with trucks because of the bulk and weight of wheel-tire assemblies. Also, truck designs in use today complicate the removal of a tire therefrom because the wheel-tire assembly must be lifted so that it can be pulled off the axle. This contrasts with automobile wheels when the wheel-tire assembly can more readily be removed from the axle once the lug nuts are removed.

SUMMARY OF THE INVENTION

The present invention discloses a tool for removing, maneuvering and replacing a wheel-tire assembly which is attached to a vehicle axle, and a method for manipulation thereof. More specifically, the present invention allows an operator of the tool to remove, maneuver and replace the wheel-tire assembly with minimal effort on his part. The tool reduces the risk of injury during each of these processes.

The tool includes an elongated member having three sections. The first is a wheel support section which acts to support the wheel primarily during removal and replacement of the wheel-tire assembly (hereinafter "wheel" or "wheel-tire assembly"). Connected to the wheel support section is a leverage section which provides a leverage arm to aid the wheel support section in removal and replacement of the wheel. The leverage section is connected to the wheel support section so that a bend is formed at the junction therebetween. This bend acts as a pivot point so the tool may pivot thereabout while the wheel is being removed. A handle section is connected to the leverage section for manipulation of the tool by an operator during removal and replacement of the wheel.

The handle section also facilitates the maneuvering of the wheel from a horizontal position on the work area or ground, to a vertical position from which the wheel may subsequently be maneuvered and repairs can be readily made. Such maneuvering of the wheel-tire assembly is performed by placing a hooked portion of the handle section between an edge of the wheel-tire assembly and the work area and while holding the support section, taking a step back, thereby providing a lateral force sufficient to raise the assembly from a horizontal towards a vertical position.

The objects, features and advantages of the present invention are readily apparent from the following description of the best modes for practicing the invention when taken in connection with the accompanying drawings.

BRIEF DESCRIPTION OF THE DRAWINGS

FIG. 1 is a perspective view of a tool for removing a wheel-tire assembly from a vehicle axle, manipulating the wheel, and replacing the wheel upon the axle with the wheel resting upon a wheel support section of the tool, and a sectioned view of the vehicle axle;

FIG. 2a is a side view of a first step in removing the wheel from the vehicle axle, in which the tool is inserted under the wheel;

FIG. 2b is a free body diagram showing the principal forces, resolved vertically and horizontally, exerted during the process of removing the wheel from the vehicle axle;

FIG. 3a is a free body diagram showing the principal forces exerted during the maneuvering process of the wheel from a horizontal position on a work area to a vertical position;

FIG. 3b is a side view of the tool resting upon the wheel after maneuvering the wheel from a reposed position on a work area to a vertical position.

BEST MODES FOR CARRYING OUT THE INVENTION

Referring to FIG. 1 of the drawings, a tool that embodies the present invention and has an integrally formed, elongated member is generally indicated by reference numeral 10. The tool 10 is used for removing, manipulating, and replacing upon a vehicle a wheel-tire assembly 42 (hereinafter "wheel" or "wheel-tire assembly"). The tool 10 includes a wheel support section 12, with a pair of wheel support members 14 and 16. Connected to the wheel support section 12 is a leverage section 18 including a pair of leverage arms 20 and 22. A handle section 24 including a pair of handle members 26 and 28 and an inwardly extending hooked portion 30 is connected to the leverage section 18. The hooked portion 30 has a pair of inwardly extending members 32 and 34 and a handle bar 36.

The preferred embodiment of the tool 10 is formed from a medium carbon steel so that bends 38 and 40 result at the junction between the leverage arms 20 and 22 and the wheel support sections 14 and 16. While a medium carbon steel has been disclosed as the preferred embodiment of the tool 10, it will readily be apparent to those of ordinary skill in the art to which this invention relates that other materials may be suitable for the construction and use of the tool 10. Such other materials include, without limitation, aluminum and its alloys, reinforced plastic, and equivalents thereof.

The tool 10 is shaped so that the leverage members 20 and 22 diverge with respect to the handle section 24. Also, the wheel support members 14 and 16 diverge with respect to the leverage members 20 and 22.

In the preferred embodiment, the wheel support members 14 and 16 are about 15 inches long, and the leverage members 20 and 22 are about 32 inches long. Good results are obtained when the handle members 26 and 28 are about 13 inches tall, and the inwardly extending handle members 32 and 34 are about 2.5 inches long, with the handle bar 36 being about 8 inches long. The preferred embodiment also has a distance of about 16.25 inches between the ends 46 and 48 of the wheel support members 14 and 16, a distance of about 13.5 inches between the bends 38 and 40 where the leverage members 20 and 22 join the wheel support members 14 and 16, and a distance of about 8 inches between the bends 50, 52 at the junction of the handle members 26, 28 and the leverage members 20 and 22.

Turning now to FIG. 2a, the method for removing the wheel 42 from the vehicle axle 44 is best illustrated. The tool 10 is moved in the direction of the arrows so that the wheel support section 12 is inserted between the wheel and the ground 54. It is inserted so that the wheel support members 14 and 16 lie flat on the ground. Upon insertion, the hooked portion 30 of the handle section 24 is pointed inwardly towards the wheel 42, and the leverage section 18 is inclined to the wheel support section 12.

In order to remove the wheel 42 from the vehicle axle 44, the handle section 24 is pushed downwardly as shown in FIG. 2b by exerting a downward force on the handle bar 36. Once the handle section 24 is urged downwardly, the leverage section 18 also lowers so that the tool 10 pivots about bends 38 and 40 so the wheel support section 12 rises into contact with the wheel 42.

Once the wheel support section 12 is in contact with the wheel, the handle section 24 is lowered further so that the wheel 42 is raised off the vehicle axle 44 and may be removed from the vehicle axle with minimal effort exerted by the operator.

FIG. 2b also depicts the principal forces acting upon the tool 10 so that the wheel may be removed. The arrow designated $F_H$ is the vertical component of the downward force exerted on the handle section 24 by the operator in order to lift the wheel 42 with respect to the vehicle axle 44. The arrow designated $F_T$ is the vertical force component of the wheel support section 12 pushing upwardly upon the wheel. The arrow designated $F_W$ is the force component of the wheel 42 pushing down on the wheel support section 12 of the tool 10.

FIG. 3a is a free body diagram of the principal forces exerted on the wheel 42 during the maneuvering process. During this process, the tool 10 is used to raise the wheel 42 from a horizontal position on the work area to a vertical position. First, the hooked portion 30 of the handle section 24 is placed between a distal segment 58 of the wheel 42 and the work area. The distal segment 58 is opposite an adjacent segment 60, where the operator applies a restraining force to the edge of the wheel 42. The operator moves the wheel support section 12 in order to lift the wheel-tire assembly 42. The force exerted by the operator on the tool 10 is represented by the force arrow $F_O$. While exerting the force $F_O$ on the tool 10, the operator must apply a force to the edge of the wheel-tire assembly 42 with one foot or by other means to prevent the wheel-tire assembly from slipping. This force exerted on the edge of the tire is represented by the arrow designated $F_E$ in FIG. 3a.

As best shown in FIG. 3b, when the wheel-tire assembly 42 has been raised to its vertical position, the leverage section 18 rests upon the distal segment 58 of the assembly 42. The purpose of raising the wheel to the vertical position is to facilitate its subsequent movement. Once in a vertical position, it can be rolled to another work area or to a position near the vehicle axle so that it may be replaced thereupon.

The process for replacing the wheel-tire assembly 42 effectively retraces the steps of removing the tire as shown in FIGS. 2a and 2b. When replacing the wheel-tire assembly 42 upon the vehicle axle 44, the wheel-tire assembly 42 is maneuvered into position adjacent to the vehicle axle. Then the wheel support section 12 is positioned astride and below the wheel-tire assembly 42 as depicted in FIG. 2a. While the wheel-tire assembly is resting on the pair of wheel support members 14 and 16, the handle section 24 is lifted to a level so that the wheel-tire assembly 42 is aligned with the vehicle axle 44. The handle section is then lifted further so that the wheel-tire assembly 42 engages the vehicle axle 44. Once the replacement process is complete, the wheel 42 and tool 10 position will be similar to that shown in FIG. 2a.

While the best mode for carrying out the invention has been described in detail, those familiar with the art to which this invention relates will recognize various alternative designs and embodiments for practicing the invention as defined by the following claims.

What is claimed is:

1. A tool for removing, maneuvering, and replacing a wheel-tire assembly which is demountably attached to a vehicle axle, comprising:

a handle section including an elongated handle bar and a pair of handle members, the handle bar having opposite ends, said opposite ends including portions transverse to the handle bar, each of the handle members having a first end connected to one of the transverse portions of the opposite ends of the elongated handle bar in a manner transverse to both the handle bar and the transverse portions, said handle members also having a second end; and a pair of elongated members, each elongated member being respectively connected to the second end of one of the handle members so that the pair of elongated members is offset from the handle bar by the distance of the handle members, and each of the elongated members being offset from each other by the distance of the handle bar;

each elongated member having a wheel support member for supporting the wheel-tire assembly during the removing and replacing thereof; and a leverage member for providing a leverage arm in conjunction therewith, the wheel support members lying in a plane generally parallel to a plane containing the handle bar and the transverse portions, such that the handle section may support one side of the wheel-tire assembly and the elongated members may support another side of the wheel-tire assembly when a peripheral edge of the wheel-tire assembly is resting on the handle members to prevent rotation of the wheel-tire assembly;

said elongated handle bar being graspable by the entire palm of the operator's hand for applying a motive force to the tool without injury to the operator's hand.

2. The tool of claim 1 wherein said elongated members are integrally formed so that said wheel support members, said leverage member and said handle section thereof are interconnected.

3. The tool of claim 1 wherein said leverage members of said leverage section diverge from each other so that the distance therebetween increases with the distance from said handle section.

4. The tool of claim 1 wherein said wheel support members section diverge from each other so that the distance therebetween increases with the distance from said handle section.

5. The tool of claim 1 wherein said leverage members and said wheel support members are inclined with respect to each other so that a bend is formed at the junction thereof, which enables said elongated members to be pivotable thereabout during removal and replacement of the wheel.

* * * * *